United States Patent
Tang

(10) Patent No.: US 11,374,717 B2
(45) Date of Patent: Jun. 28, 2022

(54) METHOD AND DEVICE FOR DETERMINING RESOURCES FOR CONTROL CHANNEL, AND COMPUTER STORAGE MEDIUM

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 196 days.

(21) Appl. No.: 16/338,952

(22) PCT Filed: Feb. 14, 2018

(86) PCT No.: PCT/CN2018/076865
§ 371 (c)(1),
(2) Date: Apr. 5, 2021

(87) PCT Pub. No.: WO2019/157725
PCT Pub. Date: Aug. 22, 2019

(65) Prior Publication Data
US 2021/0234659 A1    Jul. 29, 2021

(51) Int. Cl.
*H04L 5/00* (2006.01)
*H04L 27/26* (2006.01)
*H04W 72/04* (2009.01)

(52) U.S. Cl.
CPC .......... *H04L 5/0053* (2013.01); *H04L 5/0091* (2013.01); *H04L 27/26025* (2021.01); *H04W 72/042* (2013.01)

(58) Field of Classification Search
CPC ............. H04L 5/0053; H04L 27/26025; H04L 5/0091; H04W 72/042
See application file for complete search history.

(56) References Cited

U.S. PATENT DOCUMENTS

2017/0094624 A1    3/2017  Balachandran et al.
2020/0178188 A1*   6/2020  Zhao .................... H04L 27/2666

FOREIGN PATENT DOCUMENTS

| CN | 109803377 A | 5/2019 |
| WO | 2016203290 A1 | 12/2016 |
| WO | 2017160100 A2 | 9/2017 |

OTHER PUBLICATIONS

"3rd Generation Partnership Project; Technical Specification Group Radio Access Network; NR; Physical layer procedures for control (Release 15)", 3GPP Draft; R1 -1801293 TS 38213_V1500_With Change Marks, 3rd Generation Partnership Project (3GPP), Mobile Competence Centre 650, Route Des Lucioles ; F-06921 Sophia-Antipolis Cedex ; France, Feb. 12, 2018 (Feb. 12, 2018), XP051398860.

(Continued)

*Primary Examiner* — Ronald B Abelson
(74) *Attorney, Agent, or Firm* — Ladas & Parry, LLP

(57) ABSTRACT

A method and device for determining resources for a control channel, and a computer storage medium are provided. The method includes that: a terminal receives a first synchronization signal block (SSB), and determines, based on the first SSB, that a serial number of a starting slot of a first monitoring window of a first downlink control channel in a radio frame is:

$$n_0 = (O \cdot 2^\mu + \lfloor i \cdot M \rfloor) \bmod \left( \frac{1}{2} \cdot N_{slot}^{frame,\mu} \right) \text{ or,}$$

$$n_0 = (O \cdot 2^\mu + \lfloor i \cdot M \rfloor) \bmod \left( \frac{1}{2} \cdot N_{slot}^{frame,\mu} \right) + \frac{1}{2} \cdot N_{slot}^{frame,\mu} \cdot HRF,$$

where $n_0$ is the serial number of the starting slot of the first monitoring window in the radio frame, $N_{slot}^{frame,\mu}$ is the number of slots in the radio frame, M and O are determined (Continued)

through resource configuration information in a physical broadcast channel (PBCH) of the first SSB, $\mu$ is determined through a subcarrier spacing of the first downlink control channel, HRF is a serial number of a half frame, and i is a serial number of the first SSB.

15 Claims, 3 Drawing Sheets

(56) References Cited

OTHER PUBLICATIONS

CATT : Summary of Offline Discussion on Remaining Minimum System Information, 3GPP Draft; R1-1721605 Summary for RMSI Issues Nov 30A, 3rd Generation Partnership Project (3GPP ), Mobi Le Competence Centre 650, Route Des Lucioles ; F-06921 Sophia-Anti Polis Cedex ; France, vol. RAN WG1, No. Reno, USA; Nov. 27, 2017-Dec. 1, 2017 Dec. 1, 2017 (Dec. 1, 2017), XP051370642.
International Search Report in the international application No. PCT/CN2018/076865, dated Aug. 21, 2018.
Supplementary European Search Report in the European application No. 18852744.4, dated Oct. 7, 2019.
First Office Action of the Chinese application No. 201880003467.8, dated Aug. 26, 2019.
International Search Report in international application No. PCT/CN2018/076865, dated Aug. 21, 2018 and machine translation provided by Google translate.
Written Opinion of the international Search Authority in international application No. PCT/CN2018/076865, dated Aug. 21, 2018 and machine translation provided by Google translate.

\* cited by examiner

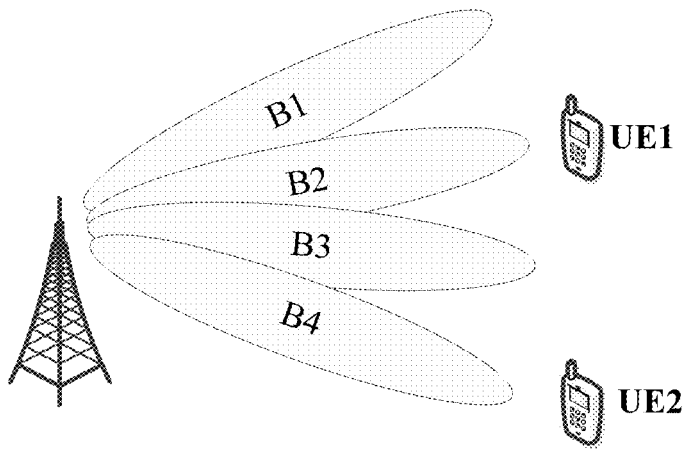

FIG. 1

| PSS | PBCH | SSS | PBCH |

FIG. 2

A terminal receives a first SSB, and determines, based on the first SSB, that a serial number of a starting slot of a first monitoring window of a first downlink control channel in a radio frame is:

$$n_0 = (O \cdot 2^\mu + \lfloor i \cdot M \rfloor) \bmod \left(\frac{1}{2} \cdot N_{slot}^{frame,\mu}\right) \text{ or, } n_0 = (O \cdot 2^\mu + \lfloor i \cdot M \rfloor) \bmod \left(\frac{1}{2} \cdot N_{slot}^{frame,\mu}\right) + \frac{1}{2} \cdot N_{slot}^{frame,\mu} \cdot HRF,$$

where $n_0$ is the serial number of the starting slot of the first monitoring window in the radio frame, $N_{slot}^{frame,\mu}$ is the number of slots in the radio frame, M And O are determined through resource configuration information in a PBCH of the first SSB, $\mu$ is determined through a subcarrier spacing of the first downlink control channel, HRF is a serial number of a half frame, and $i$ is a serial number of the first SSB

A network device transmits a first SSB to a terminal to enable the terminal to determine, based on the first SSB, that a serial number of a starting slot of a first monitoring window of a first downlink control channel in a radio frame is: $n_0 = (O \cdot 2^\mu + \lfloor i \cdot M \rfloor) \bmod \left( \frac{1}{2} \cdot N_{slot}^{frame,\mu} \right)$ or, $n_0 = (O \cdot 2^\mu + \lfloor i \cdot M \rfloor) \bmod \left( \frac{1}{2} \cdot N_{slot}^{frame,\mu} \right) + \frac{1}{2} \cdot N_{slot}^{frame,\mu} \cdot HRF$, where $n_0$ is the serial number of the starting slot of the first monitoring window in the radio frame, $N_{slot}^{frame,\mu}$ is the number of slots in the radio frame, M and O are determined through resource configuration information in a PBCH of the first SSB, $\mu$ is determined through a subcarrier spacing of the first downlink control channel, HRF is a serial number of a half frame, and $i$ is a serial number of the first SSB

FIG. 4

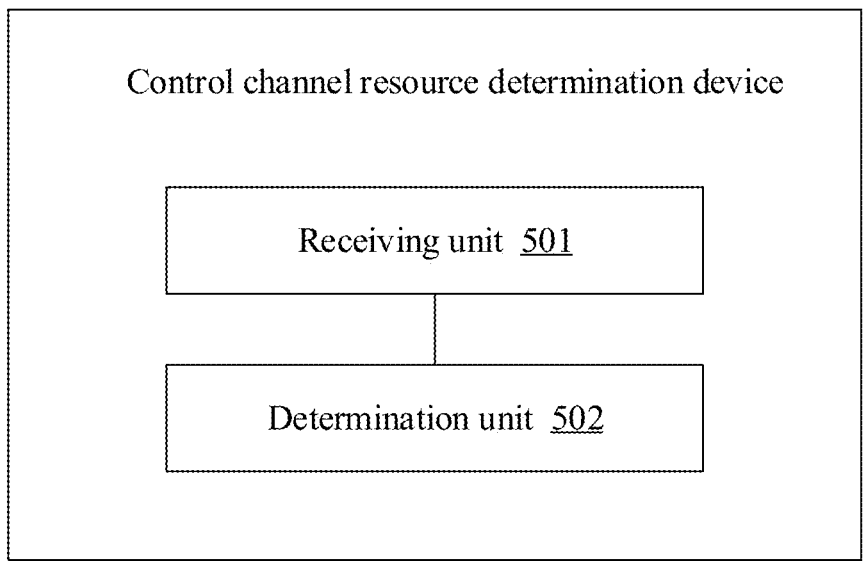

FIG. 5

METHOD AND DEVICE FOR DETERMINING RESOURCES FOR CONTROL CHANNEL, AND COMPUTER STORAGE MEDIUM

CROSS-REFERENCE TO RELATED APPLICATION

The present application is the U.S. national phase application of PCT Application No. PCT/CN2018/076865 filed on Feb. 14, 2018, the disclosure of which is incorporated herein in its entirety by reference.

TECHNICAL FIELD

The disclosure relates to the technical field of wireless communications, and particularly to a method and device for determining resources for a control channel, and a computer storage medium.

BACKGROUND

In a 5th-generation (5G) new radio (NR) system, a common search space is required to be defined for initially accessed user equipments (UE) to receive common control information, for example, remaining minimum system information (RMSI). Therefore, the concept of control resource set (CORESET) is introduced. A CORESET is defined as a resource set for bearing control information, and a UE detects a physical downlink control channel (PDCCH) in the resource set to obtain scheduling information of a physical downlink shared channel (PDSCH) bearing RMSI. Resource configuration information of the CORESET is born in a physical broadcast channel (PBCH) of a synchronization signal block (SSB), and is configured for the UE to receive the RMSI.

The resource configuration information of the CORESET includes a frequency-domain position of the PDCCH and a monitoring window of the PDCCH. The monitoring window of the PDCCH is determined in the following manner: if a multiplexing manner for the SSB and the CORESET is pattern 1, the UE monitors a Type0-PDCCH common search space in two continuous slots. A serial number of a starting slot in the two continuous slots is $n_0$. Each SSB of which a serial number is i corresponds to a monitoring window, and a serial number $n_0$ of a starting slot of the monitoring window is determined by using the following formula:

$$n_0 = (O \cdot 2^\mu + \lfloor i \cdot M \rfloor) \bmod N_{slot}^{frame,\mu},$$

where $N_{slot}^{frame,\mu}$ is the number of slots in a radio frame, M and O are indicated through the resource configuration information of the CORESET in the PBCH, possible values of O include {0, 2, 5, 7} in a frequency domain of below 6 GHz and include {0, 2.5, 5, 7.5} in a frequency domain of above 6 GHz, possible values of M include {½, 1, 2}, possible values of μ are related to a subcarrier spacing of the PDCCH, and $\mu \in \{0, 1, 2, 3\}$.

In the solution, a result obtained by $(O \cdot 1^\mu + \lfloor i \cdot M \rfloor)$ may include $[0, N_{slot}^{frame,\mu}]$, and thus $n_0$ which may be obtained according to $n_0 = (O \cdot 2^\mu + \lfloor i \cdot M \rfloor) \bmod N_{slot}^{frame,\mu}$ may be any slot in a 10 ms radio frame. In an NR system, a slot in a radio frame may be configured as a downlink slot or an uplink slot, and if the calculated $n_0$ are distributed in various slots among the radio frames, these slots are required to be configured as downlink slots for transmitting RMS. As a consequence, resources which may be configured as uplink slots are reduced, and there are insufficient uplink resources.

SUMMARY

For solving the foregoing technical problem, embodiments of the disclosure provide a method and device for determining resources for a control channel and a computer storage medium.

The embodiments of the disclosure provide a method for determining resources for a control channel, which may include the following operations.

A terminal receives a first SSB, and determines, based on the first SSB, that a serial number of a starting slot of a first monitoring window of a first downlink control channel in a radio frame is:

$$n_0 = (O \cdot 2^\mu + \lfloor i \cdot M \rfloor) \bmod \left(\frac{1}{2} \cdot N_{slot}^{frame,\mu}\right) \text{ or,}$$

$$n_0 = (O \cdot 2^\mu + \lfloor i \cdot M \rfloor) \bmod \left(\frac{1}{2} \cdot N_{slot}^{frame,\mu}\right) + \frac{1}{2} \cdot N_{slot}^{frame,\mu} \cdot HRF,$$

where $n_0$ may be the serial number of the starting slot of the first monitoring window in the radio frame, $N_{slot}^{frame,\mu}$ may be the number of slots in the radio frame, M and O may be determined through resource configuration information in a PBCH of the first SSB, μ may be determined through a subcarrier spacing of the first downlink control channel, HRF may be a serial number of a half frame, and i may be a serial number of the first SSB.

In the embodiments of the disclosure, in case that the serial number of the starting slot of the first monitoring window in the radio frame is $$n_0 = (O \cdot 2^\mu + \lfloor i \cdot M \rfloor) \bmod \left(\frac{1}{2} \cdot N_{slot}^{frame,\mu}\right),$$

the starting slot of the first monitoring window may be located in slots of a first half frame of the radio frame; or, the starting slot of the first monitoring window may be located in slots of a second half frame of the radio frame.

In the embodiments of the disclosure, in case that the serial number of the starting slot of the first monitoring window in the radio frame is $$n_0 = (O \cdot 2^\mu + \lfloor i \cdot M \rfloor) \bmod \left(\frac{1}{2} \cdot N_{slot}^{frame,\mu}\right) + \frac{1}{2} \cdot N_{slot}^{frame,\mu} \cdot HRF,$$

a serial number of a half frame where the starting slot of the first monitoring window is located may be the same as a serial number of a half frame where the first SSB is located.

When HRF indicates the first half frame, both the half frame where the starting slot of the first monitoring window is located and the half frame where the first SSB is located may be the first half frame.

When HRF indicates the second half frame, both the half frame where the starting slot of the first monitoring window is located and the half frame where the first SSB is located may be the second half frame.

In the embodiments of the disclosure, the method may further include the following operation.

The terminal determines a serial number of the radio frame where the starting slot of the first monitoring window is located in the following manner:

if $\left\lfloor (O \cdot 2^\mu + \lfloor i \cdot M \rfloor) / \frac{1}{2} \cdot N_{slot}^{frame,\mu} \right\rfloor \mod 2 = 0, SFN_C \mod 2 = 0;$ and if $\left\lfloor (O \cdot 2^\mu + \lfloor i \cdot M \rfloor) / \frac{1}{2} \cdot N_{slot}^{frame,\mu} \right\rfloor \mod 2 = 1, SFN_C \mod 2 = 1,$ where $SFN_C$ may be the serial number of the radio frame where the starting slot of the first monitoring window is located.

In the embodiments of the disclosure, the first downlink control channel may be configured to schedule a first downlink data channel, and the first downlink data channel may bear RMSI.

The embodiments of the disclosure provide a method for determining resources for a control channel, which may include the following operations.

A network device transmits a first SSB to a terminal to enable the terminal to determine, based on the first SSB, that a serial number of a starting slot of a first monitoring window of a first downlink control channel in a radio frame is:

$$n_0 = (O \cdot 2^\mu + \lfloor i \cdot M \rfloor) \mod \left( \frac{1}{2} \cdot N_{slot}^{frame,\mu} \right) \text{ or,}$$

$$n_0 = (O \cdot 2^\mu + \lfloor i \cdot M \rfloor) \mod \left( \frac{1}{2} \cdot N_{slot}^{frame,\mu} \right) + \frac{1}{2} \cdot N_{slot}^{frame,\mu} \cdot HRF,$$

where $n_0$ may be the serial number of the starting slot of the first monitoring window in the radio frame, $N_{slot}^{frame,\mu}$ may be the number of slots in the radio frame, M and O may be determined through resource configuration information in a PBCH of the first SSB, $\mu$ may be determined through a subcarrier spacing of the first downlink control channel, HRF may be a serial number of a half frame, and i may be a serial number of the first SSB.

In the embodiments of the disclosure, in case that the serial number of the starting slot of the first monitoring window in the radio frame is $$n_0 = (O \cdot 2^\mu + \lfloor i \cdot M \rfloor) \mod \left( \frac{1}{2} \cdot N_{slot}^{frame,\mu} \right),$$

the starting slot of the first monitoring window may be located in slots of a first half frame of the radio frame; or, the starting slot of the first monitoring window may be located in slots of a second half frame of the radio frame.

In the embodiments of the disclosure, in case that the serial number of the starting slot of the first monitoring window in the radio frame is $$n_0 = (O \cdot 2^\mu + \lfloor i \cdot M \rfloor) \mod \left( \frac{1}{2} \cdot N_{slot}^{frame,\mu} \right) + \frac{1}{2} \cdot N_{slot}^{frame,\mu} \cdot HRF,$$

a serial number of a half frame where the starting slot of the first monitoring window is located may be the same as a serial number of a half frame where the first SSB is located.

When HRF indicates the first half frame, both the half frame where the starting slot of the first monitoring window is located and the half frame where the first SSB is located may be the first half frame.

When HRF indicates the second half frame, both the half frame where the starting slot of the first monitoring window is located and the half frame where the first SSB is located may be the second half frame.

In the embodiments of the disclosure, the first SSB may further be configured for the terminal to determine a serial number of the radio frame where the starting slot of the first monitoring window is located in the following manner:

if $\left\lfloor (O \cdot 2^\mu + \lfloor i \cdot M \rfloor) / \frac{1}{2} \cdot N_{slot}^{frame,\mu} \right\rfloor \mod 2 = 0, SFN_C \mod 2 = 0;$ and if $\left\lfloor (O \cdot 2^\mu + \lfloor i \cdot M \rfloor) / \frac{1}{2} \cdot N_{slot}^{frame,\mu} \right\rfloor \mod 2 = 1, SFN_C \mod 2 = 1,$ where $SFN_C$ may be the serial number of the radio frame where the starting slot of the first monitoring window is located.

In the embodiments of the disclosure, the first downlink control channel may be configured to schedule a first downlink data channel, and the first downlink data channel may bear RMSI.

The embodiments of the disclosure provide a device for determining resources for a control channel, which may include a receiving unit and a determination unit.

The receiving unit may be configured to receive a first SSB.

The determination unit may be configured to determine, based on the first SSB, that a serial number of a starting slot of a first monitoring window of a first downlink control channel in a radio frame is:

$$n_0 = (O \cdot 2^\mu + \lfloor i \cdot M \rfloor) \mod \left( \frac{1}{2} \cdot N_{slot}^{frame,\mu} \right) \text{ or,}$$

$$n_0 = (O \cdot 2^\mu + \lfloor i \cdot M \rfloor) \mod \left( \frac{1}{2} \cdot N_{slot}^{frame,\mu} \right) + \frac{1}{2} \cdot N_{slot}^{frame,\mu} \cdot HRF,$$

where $n_0$ may be the serial number of the starting slot of the first monitoring window in the radio frame, $N_{slot}^{frame,\mu}$ may be the number of slots in the radio frame, M and O may be determined through resource configuration information in a PBCH of the first SSB, $\mu$ may be determined through a subcarrier spacing of the first downlink control channel, HRF may be a serial number of a half frame, and i may be a serial number of the first SSB.

In the embodiments of the disclosure, in case that the serial number of the starting slot of the first monitoring window in the radio frame is $$n_0 = (O \cdot 2^\mu + \lfloor i \cdot M \rfloor) \mod \left( \frac{1}{2} \cdot N_{slot}^{frame,\mu} \right),$$

the starting slot of the first monitoring window may be located in slots of a first half frame of the radio frame; or, the starting slot of the first monitoring window may be located in slots of a second half frame of the radio frame.

In the embodiments of the disclosure, in case that the serial number of the starting slot of the first monitoring window in the radio frame is $$n_0 = (O \cdot 2^\mu + \lfloor i \cdot M \rfloor) \mod \left( \frac{1}{2} \cdot N_{slot}^{frame,\mu} \right) + \frac{1}{2} \cdot N_{slot}^{frame,\mu} \cdot HRF,$$

a serial number of a half frame where the starting slot of the first monitoring window is located may be the same as a serial number of a half frame where the first SSB is located.

When HRF indicates the first half frame, both the half frame where the starting slot of the first monitoring window is located and the half frame where the first SSB is located may be the first half frame.

When HRF indicates the second half frame, both the half frame where the starting slot of the first monitoring window is located and the half frame where the first SSB is located may be the second half frame.

In the embodiments of the disclosure, the determination unit may further be configured to determine a serial number of the radio frame where the starting slot of the first monitoring window is located in the following manner:

$$\text{if } \left\lfloor (O \cdot 2^\mu + \lfloor i \cdot M \rfloor) \Big/ \frac{1}{2} \cdot N_{slot}^{frame,\mu} \right\rfloor \bmod 2 = 0, SFN_C \bmod 2 = 0; \text{ or}$$

$$\text{if } \left\lfloor (O \cdot 2^\mu + \lfloor i \cdot M \rfloor) \Big/ \frac{1}{2} \cdot N_{slot}^{frame,\mu} \right\rfloor \bmod 2 = 1, SFN_C \bmod 2 = 1,$$

where $SFN_C$ may be the serial number of the radio frame where the starting slot of the first monitoring window is located.

In the embodiments of the disclosure, the first downlink control channel may be configured to schedule a first downlink data channel, and the first downlink data channel may bear RMSI.

The embodiments of the disclosure provide a device for determining resources for a control channel, which may include a transmitting unit.

The transmitting unit may be configured to transmit a first SSB to a terminal to enable the terminal to determine, based on the first SSB, that a serial number of a starting slot of a first monitoring window of a first downlink control channel in a radio frame is:

$$n_0 = (O \cdot 2^\mu + \lfloor i \cdot M \rfloor) \bmod \left( \frac{1}{2} \cdot N_{slot}^{frame,\mu} \right) \text{ or,}$$

$$n_0 = (O \cdot 2^\mu + \lfloor i \cdot M \rfloor) \bmod \left( \frac{1}{2} \cdot N_{slot}^{frame,\mu} \right) + \frac{1}{2} \cdot N_{slot}^{frame,\mu} \cdot HRF,$$

where $n_0$ may be the serial number of the starting slot of the first monitoring window in the radio frame, $N_{slot}^{frame,\mu}$ may be the number of slots in the radio frame, M and O may be determined through resource configuration information in a PBCH of the first SSB, μ may be determined through a subcarrier spacing of the first downlink control channel, HRF may be a serial number of a half frame, and i may be a serial number of the first SSB.

In the embodiments of the disclosure, in case that the serial number of the starting slot of the first monitoring window in the radio frame is $$n_0 = (O \cdot 2^\mu + \lfloor i \cdot M \rfloor) \bmod \left( \frac{1}{2} \cdot N_{slot}^{frame,\mu} \right),$$

the starting slot of the first monitoring window may be located in slots of a first half frame of the radio frame; or, the starting slot of the first monitoring window may be located in slots of a second half frame of the radio frame.

In the embodiments of the disclosure, in case that the serial number of the starting slot of the first monitoring window in the radio frame is $$n_0 = (O \cdot 2^\mu + \lfloor i \cdot M \rfloor) \bmod \left( \frac{1}{2} \cdot N_{slot}^{frame,\mu} \right) + \frac{1}{2} \cdot N_{slot}^{frame,\mu} \cdot HRF,$$

a serial number of a half frame where the starting slot of the first monitoring window is located may be the same as a serial number of a half frame where the first SSB is located.

When HRF indicates the first half frame, both the half frame where the starting slot of the first monitoring window is located and the half frame where the first SSB is located may be the first half frame.

When HRF indicates the second half frame, both the half frame where the starting slot of the first monitoring window is located and the half frame where the first SSB is located may be the second half frame.

In the embodiments of the disclosure, the first SSB may further be configured for the terminal to determine a serial number of the radio frame where the starting slot of the first monitoring window is located in the following manner:

$$\text{if } \left\lfloor (O \cdot 2^\mu + \lfloor i \cdot M \rfloor) \Big/ \frac{1}{2} \cdot N_{slot}^{frame,\mu} \right\rfloor \bmod 2 = 0,$$

$$SFN_c \bmod 2 = 0; \text{ and}$$

$$\text{if } \left\lfloor (O \cdot 2^\mu + \lfloor i \cdot M \rfloor) \Big/ \frac{1}{2} \cdot N_{slot}^{frame,\mu} \right\rfloor \bmod 2 = 1,$$

$$SFN_c \bmod 2 = 1,$$

where $SFN_C$ may be the serial number of the radio frame where the starting slot of the first monitoring window is located.

In the embodiments of the disclosure, the first downlink control channel may be configured to schedule a first downlink data channel, and the first downlink data channel may bear RMSI.

The embodiments of the disclosure provide a computer storage medium, in which computer-executable instructions may be stored, the computer-executable instruction being executed by a processor to implement the abovementioned method for determining resources for a control channel.

In the technical solutions of the embodiments of the disclosure, the terminal receives the first SSB, and determines, based on the first SSB, that the serial number of the starting slot of the first monitoring window of the first downlink control channel in the radio frame is:

$$n_0 = (O \cdot 2^\mu + \lfloor i \cdot M \rfloor) \bmod \left( \frac{1}{2} \cdot N_{slot}^{frame,\mu} \right) \text{ or,}$$

$$n_0 = (O \cdot 2^\mu + \lfloor i \cdot M \rfloor) \bmod \left( \frac{1}{2} \cdot N_{slot}^{frame,\mu} \right) + \frac{1}{2} \cdot N_{slot}^{frame,\mu} \cdot HRF,$$

where $n_0$ is the serial number of the starting slot of the first monitoring window in the radio frame, $N_{slot}^{frame,\mu}$ is the number of the slots in the radio frame, M and O are determined through the resource configuration information in the PBCH of the first SSB, μ is determined through the subcarrier spacing of the first downlink control channel, HRF is the serial number of the half frame, and i is the serial number of the first SSB. With adoption of the technical solutions of the embodiments of the disclosure, a monitoring window of a PDCCH is limited in part of slots of a radio frame (for example, a slot range of a half frame), so that more flexible configuration of uplink slot resources by the network is facilitated, a configuration demand for uplink resources is ensured, and the utilization rate of system resources is increased.

BRIEF DESCRIPTION OF DRAWINGS

The drawings described here are adopted to provide a further understanding to the disclosure, and form a part of the application. Schematic embodiments of the disclosure and descriptions thereof are adopted to explain the disclosure and not intended to form improper limits to the disclosure. In the drawings:

FIG. 1 illustrates a schematic diagram depicting that a base station transmits wireless signals through a beam according to an embodiment of the disclosure.

FIG. 2 illustrates a schematic diagram of an SSB according to an embodiment of the disclosure.

FIG. 3 illustrates a first flowchart of a method for determining resources for a control channel according to an embodiment of the disclosure.

FIG. 4 illustrates a second flowchart of a method for determining resources for a control channel according to an embodiment of the disclosure.

FIG. 5 illustrates a first structure diagram of a device for determining resources for a control channel according to an embodiment of the disclosure.

DETAILED DESCRIPTION

Figure 6:
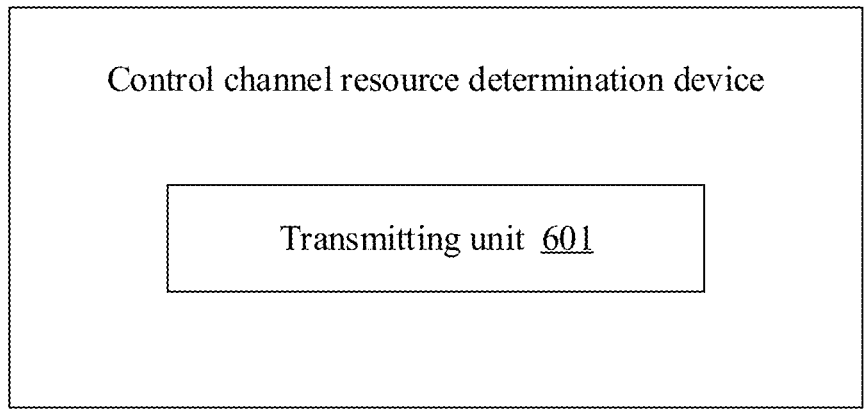
FIG. 6 illustrates a second structure diagram of a device for determining resources for a control channel according to an embodiment of the disclosure.

For the convenience of understanding the technical solutions of the embodiments of the disclosure, techniques related to the embodiments of the disclosure will be described below.

1) Beam Transmission in 5G

Since a frequency band adopted for a 5G system is higher than that for Long Term Evolution (LTE), path loss for wireless signal transmission increases and coverage of a wireless signal is reduced. In this case, in order to compensate for the path loss, it is feasible to form beams using a beamforming technology through a multi-antenna system of a base station, which increases a gain of the wireless signal. A beam is directional, and a narrow beam may not cover all users in a cell but only cover part of region of the cell. As illustrated in FIG. 1, the base station may transmit signals through four beams in different directions. Beam B2 may not cover UE2 but only cover UE1. Beam B4 may not cover UE1 but only cover UE2.

The common channel and signals, for example, Synchronization Signals (SSs) and a broadcast channel, in a 5G NR system are required to cover a whole cell in a multi-beam scanning manner for UE in the cell to receive. Multi-beam transmitting of SSs is implemented by defining an SS burst set. An SS burst set includes one or more SS bursts, and an SS burst includes one or more SSBs. An SSB is configured to bear SSs and broadcast channel of a beam. Therefore, an SS burst set may include SSs of beams with a number the same as that of SSBs in a cell. As illustrated in FIG. 2, an SSB includes a Primary Synchronization Signal (PSS) in one symbol, a Secondary Synchronization Signal (SSS) in one symbol, and a PBCH in two symbols.

A period of an SS burst set may be configured, and the SS burst set sent in a period is born in a 5 ms time window for transmitting. For example, for a 15 kHz subcarrier spacing, a slot includes 14 symbols and may bear two SSBs. Information about a serial number of an SSB is born in the SSB, and UE recognizes the serial number corresponding to the received SSB through the information. The number L of the SSBs is determined according to a frequency band of a system.

In case of a frequency band of below 3 GHz, L=4.
In case of a frequency band of 3 GHz to 6 GHz, L=8.
In case of a frequency band of 6 GHz to 52.6 GHz, L=64.

Multi-beam scanning is required by the SS and the PBCH. Furthermore, some other common information, for example, RMSI and paging, is also required to be sent in a multi-beam scanning manner.

2) Determination of a Monitoring Window of an RMSI PDCCH

Resource configuration information of an RMSI CORESET includes a frequency-domain position of a PDCCH and a monitoring window of the PDCCH. The monitoring window of the RMSI PDCCH is determined in the following manner: if a multiplexing manner for an SSB and the CORESET is pattern 1, UE monitors a type0-PDCCH common search space in two continuous slots. A serial number of a starting slot in the two continuous slots is $n_0$. Each SSB of which a serial number is i corresponds to a monitoring window, and a serial number $n_0$ of a starting slot of the monitoring window is determined through the following formula:

$$n_0 = (O \cdot 2^{\mu} + \lfloor i \cdot M \rfloor) \bmod N_{slot}^{frame,\mu},$$

where $N_{slot}^{frame,\mu}$ is the number of slots in a radio frame, M and O are indicated through the resource configuration information of the CORESET in a PBCH, a value of O includes {0, 2, 5, 7} in a frequency domain of below 6 GHz and includes {0, 2.5, 5, 7.5} in a frequency domain of above 6 GHz, and a value of M includes {½, 1, 2}. As illustrated in Table 1 and Table 2, Table 1 illustrates parameters of the PDCCH monitoring window of the type0-PDCCH common search space in case that the multiplexing manner for the SSB and the CORESET is pattern 1 and a range of a frequency band is 1, and Table 2 illustrates the parameters of the PDCCH monitoring window of the type0-PDCCH common search space in case that the multiplexing manner for the SSB and the CORESET is 1 and the range of the frequency band is 2.

TABLE 1

| Serial number | O | Serial number of the search space set (each slot) | M | Serial number of the first symbol |
|---|---|---|---|---|
| 0 | 0 | 1 | 1 | 0 |
| 1 | 0 | 2 | ½ | {0, if i is even}, {$N_{symb}^{CORESET}$, if i is odd} |
| 2 | 2 | 1 | 1 | 0 |
| 3 | 2 | 2 | ½ | {0, if i is even}, {$N_{symb}^{CORESET}$, if i is odd} |
| 4 | 5 | 1 | 1 | 0 |
| 5 | 5 | 2 | ½ | {0, if i is even}, {$N_{symb}^{CORESET}$, if i is odd} |
| 6 | 7 | 1 | 1 | 0 |
| 7 | 7 | 2 | ½ | {0, if i is even}, {$N_{symb}^{CORESET}$, if i is odd} |
| 8 | 0 | 1 | 2 | 0 |

TABLE 1-continued

| Serial number | O | Serial number of the search space set (each slot) | M | Serial number of the first symbol |
|---|---|---|---|---|
| 9 | 5 | 1 | 2 | 0 |
| 10 | 0 | 1 | 1 | 1 |
| 11 | 0 | 1 | 1 | 2 |
| 12 | 2 | 1 | 1 | 1 |
| 13 | 2 | 1 | 1 | 2 |
| 14 | 5 | 1 | 1 | 1 |
| 15 | 5 | 1 | 1 | 2 |

TABLE 2

| Serial number | O | Serial number of the search space set (each slot) | M | Serial number of the first symbol |
|---|---|---|---|---|
| 0 | 0 | 1 | 1 | 0 |
| 1 | 0 | 2 | ½ | {0, if i is even}, {7, if i is odd} |
| 2 | 2.5 | 1 | 1 | 0 |
| 3 | 2.5 | 2 | ½ | {0, if i is even}, {7, if i is odd} |
| 4 | 5 | 1 | 1 | 0 |
| 5 | 5 | 2 | ½ | {0, if i is even}, {7, if i is odd} |
| 6 | 0 | 2 | ½ | {0, if i is even}, {$N_{symb}^{CORESET}$, if i is odd} |
| 7 | 2.5 | 2 | ½ | {0, if i is even}, {$N_{symb}^{CORESET}$, if i is odd} |
| 8 | 5 | 2 | ½ | {0, if i is even}, {$N_{symb}^{CORESET}$, if i is odd} |
| 9 | 7.5 | 1 | 1 | 0 |
| 10 | 7.5 | 2 | ½ | {0, if i is even}, {7, if i is odd} |
| 11 | 7.5 | 2 | ½ | {0, if i is even}, {$N_{symb}^{CORESET}$, if i is odd} |
| 12 | 0 | 1 | 2 | 0 |
| 13 | 5 | 1 | 2 | 0 |
| 14 | | | | Reserved |
| 15 | | | | Reserved |

A value of μ is related to a subcarrier spacing of the PDCCH, and is determined according to Table 3.

TABLE 3

| μ | Δf = $2^\mu$ · 15 [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

After the serial number $n_0$ of the slot is determined, a serial number $SFN_C$ of the radio frame where the starting slot of the monitoring window is further determined as follows.

If $\lfloor (O \cdot 2^\mu + \lfloor i \cdot M \rfloor)/N_{slot}^{frame,\mu} \rfloor$ mod 2=0, $SFN_C$ mod 2=0.
If $\lfloor (O \cdot 2^\mu + \lfloor i \cdot M \rfloor)/N_{slot}^{frame,\mu} \rfloor$ mod 2=1, $SFN_C$ mod 2=1.

That is, when the number, calculated according to $(O \cdot 2^\mu + \lfloor i \cdot M \rfloor)$, of the slots is smaller than the number of the slots in the radio frame, $SFN_C$ is an even radio frame; and when it is larger than the number of the slots in the radio frame, $SFN_C$ is an odd radio frame.

FIG. 3 illustrates a first flowchart of a method for determining resources for a control channel according to an embodiment of the disclosure. As illustrated in FIG. 3, the method for determining resources for a control channel includes the following action.

In 301, a terminal receives a first SSB, and determines, based on the first SSB, that a serial number of a starting slot of a first monitoring window of a first downlink control channel in a radio frame is:

$$n_0 = (O \cdot 2^\mu + \lfloor i \cdot M \rfloor) \bmod \left( \frac{1}{2} \cdot N_{slot}^{frame,\mu} \right) \text{ or,}$$

$$n_0 = (O \cdot 2^\mu + \lfloor i \cdot M \rfloor) \bmod \left( \frac{1}{2} \cdot N_{slot}^{frame,\mu} \right) + \frac{1}{2} \cdot N_{slot}^{frame,\mu} \cdot HRF,$$

where $n_0$ is the serial number of the starting slot of the first monitoring window in the radio frame, $N_{slot}^{frame,\mu}$ is the number of slots in the radio frame, M and O are determined through resource configuration information in a PBCH of the first SSB, μ is determined through a subcarrier spacing of the first downlink control channel, HRF is a serial number of a half frame, and i is a serial number of the first SSB.

Herein, $N_{slot}^{frame,\mu}$ is the number of the slots in the radio frame. M and O are indicated through the resource configuration information of a CORESET in the PBCH. A value of O includes {0, 2, 5, 7} in a frequency domain of below 6 GHz and includes {0, 2.5, 5, 7.5} in a frequency domain of above 6 GHz. A value of M includes {½, 1, 2}. As illustrated in Table 1 and Table 2, a value of is related to a subcarrier spacing of the PDCCH, as illustrated in Table 3.

In an implementation mode, a value of HRF is born through the PBCH of the first SSB.

In an implementation mode, in case that the serial number of the starting slot of the first monitoring window in the radio frame is $$n_0 = (O \cdot 2^\mu + \lfloor i \cdot M \rfloor) \bmod \left( \frac{1}{2} \cdot N_{slot}^{frame,\mu} \right),$$

the starting slot of the first monitoring window is located in slots of a first half frame of the radio frame; or,
the starting slot of the first monitoring window is located in slots of a second half frame of the radio frame.

In an implementation mode, in case that the serial number of the starting slot of the first monitoring window in the radio frame is $$n_0 = (O \cdot 2^\mu + \lfloor i \cdot M \rfloor) \bmod \left( \frac{1}{2} \cdot N_{slot}^{frame,\mu} \right) + \frac{1}{2} \cdot N_{slot}^{frame,\mu} \cdot HRF,$$

a serial number of a half frame where the starting slot of the first monitoring window is located are the same as a serial number of a half frame where the first SSB is located.

When HRF indicates the first half frame, both the half frame where the starting slot of the first monitoring window is located and the half frame where the first SSB is located are the first half frame.

When HRF indicates the second half frame, both the half frame where the starting slot of the first monitoring window is located and the half frame where the first SSB is located are the second half frame.

For example, HRF=0 indicates the first half frame of the radio frame, and HRF=1 indicates the second half frame of the radio frame.

In the embodiment of the disclosure, the method further includes that: the terminal determines a serial number of the radio frame where the starting slot of the first monitoring window is located in the following manner:

if $\lfloor (O \cdot 2^\mu + \lfloor i \cdot M \rfloor) / \frac{1}{2} \cdot N_{slot}^{frame,\mu} \rfloor \bmod 2 = 0$, $SFN_c \bmod 2 = 0$; and if $\lfloor (O \cdot 2^\mu + \lfloor i \cdot M \rfloor) / \frac{1}{2} \cdot N_{slot}^{frame,\mu} \rfloor \bmod 2 = 1$, $SFN_c \bmod 2 = 1$, where $SFN_C$ is the serial number of the radio frame where the starting slot of the first monitoring window is located.

In the embodiment of the disclosure, the first downlink control channel is configured to schedule a first downlink data channel, and the first downlink data channel bears RMSI.

After the terminal determines a resource of the first monitoring window, the terminal detects the first downlink control channel in the first monitoring window.

FIG. 4 illustrates a second flowchart of a method for determining resources for a control channel according to an embodiment of the disclosure. As illustrated in FIG. 4, the method for determining resources for a control channel includes the following action.

In 401, a network device transmits a first SSB to a terminal, to enable the terminal to determine, based on the first SSB, that a serial number of a starting slot of a first monitoring window of a first downlink control channel in a radio frame is:

$n_0 = (O \cdot 2^\mu + \lfloor i \cdot M \rfloor) \bmod (\frac{1}{2} \cdot N_{slot}^{frame,\mu})$ or, $n_0 = (O \cdot 2^\mu + \lfloor i \cdot M \rfloor) \bmod (\frac{1}{2} \cdot N_{slot}^{frame,\mu}) + \frac{1}{2} \cdot N_{slot}^{frame,\mu} \cdot HRF$, where $n_0$ is the serial number of the starting slot of the first monitoring window in the radio frame, $N_{slot}^{frame,\mu}$ is the number of slots in the radio frame, M and O are determined through resource configuration information in a PBCH of the first SSB, $\mu$ is determined through a subcarrier spacing of the first downlink control channel, HRF is a serial number of a half frame, and i is a serial number of the first SSB.

In an implementation mode, the value of HRF is born by the PBCH of the first SSB.

In an implementation mode, in case that the serial number of the starting slot of the first monitoring window in the radio frame is $n_0 = (O \cdot 2^\mu + \lfloor i \cdot M \rfloor) \bmod (\frac{1}{2} \cdot N_{slot}^{frame,\mu})$, the starting slot of the first monitoring window is located in slots of a first half frame of the radio frame; or, the starting slot of the first monitoring window is located in slots of a second half frame of the radio frame.

In an implementation mode, in case that the serial number of the starting slot of the first monitoring window in the radio frame is $n_0 = (O \cdot 2^\mu + \lfloor i \cdot M \rfloor) \bmod (\frac{1}{2} \cdot N_{slot}^{frame,\mu}) + \frac{1}{2} \cdot N_{slot}^{frame,\mu} \cdot HRF$, a serial number of a half frame where the starting slot of the first monitoring window is located is the same as a serial number of a half frame where the first SSB is located.

When HRF indicates the first half frame, both the half frame where the starting slot of the first monitoring window is located and the half frame where the first SSB is located are the first half frame.

When HRF indicates the second half frame, both the half frame where the starting slot of the first monitoring window is located and the half frame where the first SSB is located are the second half frame.

In addition, the first SSB is further configured for the terminal to determine a serial number of the radio frame where the starting slot of the first monitoring window is located in the following manner:

if $\lfloor (O \cdot 2^\mu + \lfloor i \cdot M \rfloor) / \frac{1}{2} \cdot N_{slot}^{frame,\mu} \rfloor \bmod 2 = 0$, $SFN_c \bmod 2 = 0$; and if $\lfloor (O \cdot 2^\mu + \lfloor i \cdot M \rfloor) / \frac{1}{2} \cdot N_{slot}^{frame,\mu} \rfloor \bmod 2 = 1$, $SFN_c \bmod 2 = 1$, where $SFN_C$ is the serial number of the radio frame where the starting slot of the first monitoring window is located.

The network device transmits the first downlink control channel in the first monitoring window, and thus the terminal receives the first downlink control channel in the first monitoring window.

In the embodiment of the disclosure, the first downlink control channel is configured to schedule a first downlink data channel, and the first downlink data channel bears RMSI.

FIG. 5 illustrates a first structure diagram of a device for determining resources for a control channel according to an embodiment of the disclosure. As illustrated in FIG. 5, the device for determining resources for a control channel includes a receiving unit 501 and a determination unit 502.

The receiving unit 501 is configured to receive a first SSB.

The determination unit 502 is configured to determine, based on the first SSB, that a serial number of a starting slot of a first monitoring window of a first downlink control channel in a radio frame is:

$n_0 = (O \cdot 2^\mu + \lfloor i \cdot M \rfloor) \bmod (\frac{1}{2} \cdot N_{slot}^{frame,\mu})$ or, $n_0 = (O \cdot 2^\mu + \lfloor i \cdot M \rfloor) \bmod (\frac{1}{2} \cdot N_{slot}^{frame,\mu}) + \frac{1}{2} \cdot N_{slot}^{frame,\mu} \cdot HRF$, where $n_0$ is the serial number of the starting slot of the first monitoring window in the radio frame, $N_{slot}^{frame,\mu}$ is the number of slots in the radio frame, M and O are determined through resource configuration information in a PBCH of the first SSB, $\mu$ is determined through a subcarrier spacing of the first downlink control channel, HRF is a serial number of a half frame, and i is a serial number of the first SSB.

In an implementation mode, in case that the serial number of the starting slot of the first monitoring window in the radio frame is $$n_0 = (O \cdot 2^\mu + \lfloor i \cdot M \rfloor) \bmod \left( \frac{1}{2} \cdot N_{slot}^{frame,\mu} \right),$$

the starting slot of the first monitoring window is located in slots of a first half frame of the radio frame; or, the starting slot of the first monitoring window is located in slots of a second half frame of the radio frame.

In an implementation mode, in case that the serial number of the starting slot of the first monitoring window in the radio frame is $$n_0 = (O \cdot 2^\mu + \lfloor i \cdot M \rfloor) \bmod \left( \frac{1}{2} \cdot N_{slot}^{frame,\mu} \right) + \frac{1}{2} \cdot N_{slot}^{frame,\mu} \cdot HRF,$$

a serial number of a half frame where the starting slot of the first monitoring window is located are the same as a serial number of a half frame where the first SSB is located.

When HRF indicates the first half frame, both the half frame where the starting slot of the first monitoring window is located and the half frame where the first SSB is located are the first half frame.

When HRF indicates the second half frame, both the half frame where the starting slot of the first monitoring window is located and the half frame where the first SSB is located are the second half frame.

In the embodiment of the disclosure, the determination unit is further configured to determine a serial number of the radio frame where the starting slot of the first monitoring window is located in the following manner:

$$\text{if } \left\lfloor (O \cdot 2^\mu + \lfloor i \cdot M \rfloor) \Big/ \frac{1}{2} \cdot N_{slot}^{frame,\mu} \right\rfloor \bmod 2 = 0,$$

$$SFN_c \bmod 2 = 0; \text{ and}$$

$$\text{if } \left\lfloor (O \cdot 2^\mu + \lfloor i \cdot M \rfloor) \Big/ \frac{1}{2} \cdot N_{slot}^{frame,\mu} \right\rfloor \bmod 2 = 1,$$

$$SFN_c \bmod 2 = 1,$$

where $SFN_C$ is the serial number of the radio frame where the starting slot of the first monitoring window is located.

In an implementation mode, the first downlink control channel is configured to schedule a first downlink data channel, and the first downlink data channel bears RMSI.

Those skilled in the art should know that functions realized by each unit in the device for determining resources for a control channel illustrated in FIG. 5 may be understood with reference to the related descriptions in the abovementioned method for determining resources for a control channel. The functions of each unit in the device for determining resources for a control channel illustrated in FIG. 5 may be realized through a program running on a processor, and may also be realized through a specific logical circuit.

FIG. 6 illustrates a second structure diagram of a device for determining resources for a control channel according to an embodiment of the disclosure. As illustrated in FIG. 6, the device for determining resources for a control channel includes a transmitting unit 601.

The transmitting unit 601 is configured to transmit a first SSB to a terminal to enable the terminal to determine, based on the first SSB, that a serial number of a starting slot of a first monitoring window of a first downlink control channel in a radio frame is:

$$n_0 = (O \cdot 2^\mu + \lfloor i \cdot M \rfloor) \bmod \left( \frac{1}{2} \cdot N_{slot}^{frame,\mu} \right) \text{ or,}$$

$$n_0 = (O \cdot 2^\mu + \lfloor i \cdot M \rfloor) \bmod \left( \frac{1}{2} \cdot N_{slot}^{frame,\mu} \right) + \frac{1}{2} \cdot N_{slot}^{frame,\mu} \cdot HRF,$$

where $n_0$ is the serial number of the starting slot of the first monitoring window in the radio frame, $N_{slot}^{frame,\mu}$ is the number of slots in the radio frame, M and O are determined through resource configuration information in a PBCH of the first SSB, $\mu$ is determined through a subcarrier spacing of the first downlink control channel, HRF is a serial number of a half frame, and i is a serial number of the first SSB.

In an implementation mode, in case that the serial number of the starting slot of the first monitoring window in the radio frame is $$n_0 = (O \cdot 2^\mu + \lfloor i \cdot M \rfloor) \bmod \left( \frac{1}{2} \cdot N_{slot}^{frame,\mu} \right),$$

the starting slot of the first monitoring window is located in slots of a first half frame of the radio frame; or, the starting slot of the first monitoring window is located in slots of a second half frame of the radio frame.

In an implementation mode, in case that the serial number of the starting slot of the first monitoring window in the radio frame is $$n_0 = (O \cdot 2^\mu + \lfloor i \cdot M \rfloor) \bmod \left( \frac{1}{2} \cdot N_{slot}^{frame,\mu} \right) + \frac{1}{2} \cdot N_{slot}^{frame,\mu} \cdot HRF,$$

a serial number of a half frame where the starting slot of the first monitoring window is located is the same as a serial number of a half frame where the first SSB is located.

When HRF indicates the first half frame, both the half frame where the starting slot of the first monitoring window is located and the half frame where the first SSB is located are the first half frame.

When HRF indicates the second half frame, both the half frame where the starting slot of the first monitoring window is located and the half frame where the first SSB is located are the second half frame.

In an implementation mode, the first SSB is further configured for the terminal to determine a serial number of the radio frame where the starting slot of the first monitoring window is located in the following manner:

$$\text{if } \left\lfloor (O \cdot 2^\mu + \lfloor i \cdot M \rfloor) \Big/ \frac{1}{2} \cdot N_{slot}^{frame,\mu} \right\rfloor \bmod 2 = 0, SFN_C \bmod 2 = 0; \text{ and}$$

$$\text{if } \left\lfloor (O \cdot 2^\mu + \lfloor i \cdot M \rfloor) \Big/ \frac{1}{2} \cdot N_{slot}^{frame,\mu} \right\rfloor \bmod 2 = 1, SFN_C \bmod 2 = 1,$$

where $SFN_C$ is the serial number of the radio frame where the starting slot of the first monitoring window is located.

In an implementation mode, the first downlink control channel is configured to schedule a first downlink data channel, and the first downlink data channel bears RMSI.

Those skilled in the art should know that functions realized by each unit in the device for determining resources for a control channel illustrated in FIG. 6 may be understood with reference to the related descriptions in the abovementioned method for determining resources for a control channel. The functions of each unit in the device for determining resources for a control channel illustrated in FIG. 6 may be realized through a program running on a processor, and may also be realized through a specific logical circuit.

When being implemented in form of software function module and sold or used as an independent product, the device for determining resources for a control channel of the embodiments of the disclosure may also be stored in a computer-readable storage medium. Based on such an understanding, the technical solutions of the embodiments of the disclosure substantially or parts making contributions to the conventional art may be embodied in form of software product, and the computer software product is stored in a storage medium, including a plurality of instructions configured to enable a computer device (which may be a personal computer, a server, a network device or the like) to execute all or part of the method in each embodiment of the disclosure. The storage medium includes: various media capable of storing program codes such as a U disk, a mobile hard disk, a Read-Only Memory (ROM), a magnetic disk or an optical disk. Therefore, the embodiments of the disclosure are not limited to any specific hardware and software combination.

Correspondingly, the embodiments of the disclosure also provide a computer storage medium, in which a computer-executable instruction is stored, the computer-executable instruction being executed by a processor to implement the method for determining resources for a control channel of the embodiments of the disclosure.

Figure 7:
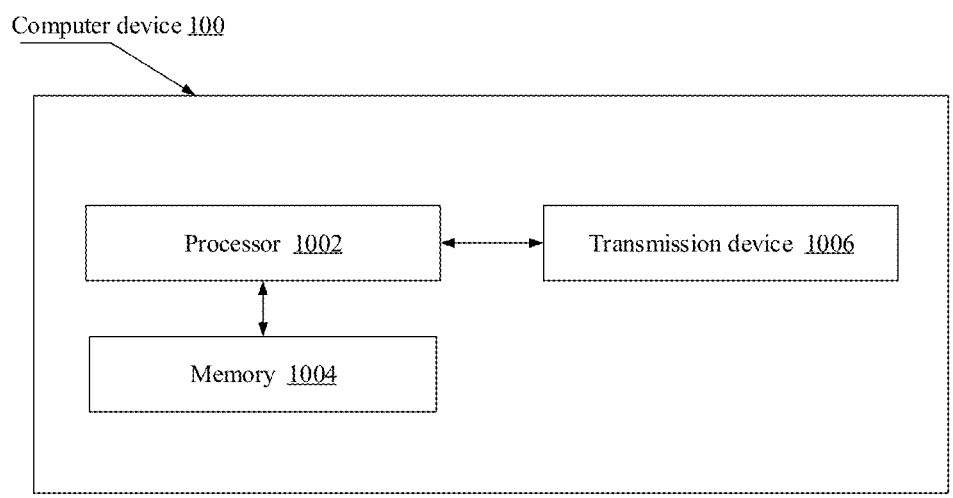
FIG. 7 illustrates a structure diagram of a computer device according to an embodiment of the disclosure.

FIG. 7 illustrates a structure diagram of a computer device according to an embodiment of the disclosure. The computer device may be a terminal and may also be a network device. As illustrated in FIG. 7, the computer device 100 may include one or more (only one is illustrated in the figure) processors 1002 (the processor 1002 may include, but not limited to, a processing device such as a Micro Control Unit (MCU) or a Field Programmable Gate Array (FPGA)), a memory 1004 configured to store data and a transmission device 1006 configured for a communication function. Those of ordinary skill in the art should know that the structure illustrated in FIG. 7 is only schematic and not intended to limit the structure of the electronic device. For example, the computer device 100 may further include components more or fewer than the components illustrated in FIG. 7 or has a configuration different from that illustrated in FIG. 7.

The memory 1004 may be configured to store a software program of application software and a module, for example, a program instruction/module corresponding to a method in the embodiments of the disclosure. The processor 1002 runs the software program and module stored in the memory 1004, thereby executing various functional applications and data processing, namely implementing the abovementioned method. The memory 1004 may include a high-speed random access memory and may also include a nonvolatile memory, for example, one or more magnetic storage devices, flash memories or other nonvolatile solid-state memories. In some examples, the memory 1004 may further include a memory arranged remotely relative to the processor 1002 and the remote memory may be connected to the computer device 100 through a network. An example of the network includes, but not limited to, the Internet, an intranet, a local area network, a mobile communication network and a combination thereof.

The transmission device 1006 is configured to receive or transmit data through a network. A specific example of the network may include a wireless network provided by a communication provider of the computer device 100. In an example, the transmission device 1006 includes a Network Interface Controller (NIC), which may be connected with another network device through a base station, thereby communicating with the Internet. In an example, the transmission device 1006 may be a Radio Frequency (RF) module, configured to communicate with the Internet in a wireless manner.

The technical solutions recorded in the embodiments of the disclosure may be freely combined without conflicts.

In some embodiments provided by the disclosure, it is to be understood that the disclosed method and intelligent device may be implemented in another manner. The device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part of all of the units may be selected according to a practical requirement to achieve the purposes of the solutions of the embodiments.

In addition, each functional unit in each embodiment of the disclosure may be integrated into a second processing unit, each unit may also serve as an independent unit and two or more than two units may also be integrated into a unit. The integrated unit may be implemented in a hardware form and may also be implemented in form of hardware and software functional unit.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure.

What is claimed is:

1. A method for determining resources for a control channel, comprising:
   receiving, by a terminal, a first synchronization signal block (SSB), and
   determining, by the terminal, based on the first SSB, that a serial number of a starting slot of a first monitoring window of a first downlink control channel in a radio frame is:

$$n_0 = (O \cdot 2^\mu + \lfloor i \cdot M \rfloor) \bmod \left(\frac{1}{2} \cdot N_{slot}^{frame,\mu}\right) \text{ or,}$$

$$n_0 = (O \cdot 2^\mu + \lfloor i \cdot M \rfloor) \bmod \left(\frac{1}{2} \cdot N_{slot}^{frame,\mu}\right) + \frac{1}{2} \cdot N_{slot}^{frame,\mu} \cdot HRF,$$

where $n_0$ is the serial number of the starting slot of the first monitoring window in the radio frame, $N_{slot}^{frame,\mu}$ is a number of slots in the radio frame, M and O are determined through resource configuration information in a physical broadcast channel (PBCH) of the first SSB, $\mu$ is determined through a subcarrier spacing of the first downlink control channel, HRF is a serial number of a half frame, and i is a serial number of the first SSB.

2. The method of claim 1, wherein, in case that the serial number of the starting slot of the first monitoring window in the radio frame is $$n_0 = (O \cdot 2^\mu + \lfloor i \cdot M \rfloor) \bmod \left( \frac{1}{2} \cdot N_{slot}^{frame,\mu} \right),$$

the starting slot of the first monitoring window is located in slots of a first half frame of the radio frame; or,
the starting slot of the first monitoring window is located in slots of a second half frame of the radio frame.

3. The method of claim 1, wherein, in case that the serial number of the starting slot of the first monitoring window in the radio frame is $$n_0 = (O \cdot 2^\mu + \lfloor i \cdot M \rfloor) \bmod \left( \frac{1}{2} \cdot N_{slot}^{frame,\mu} \right) + \frac{1}{2} \cdot N_{slot}^{frame,\mu} \cdot HRF,$$

a serial number of a half frame where the starting slot of the first monitoring window is located is the same as a serial number of a half frame where the first SSB is located;
when HRF indicates a first half frame, both the half frame where the starting slot of the first monitoring window is located and the half frame where the first SSB is located are the first half frame; or when HRF indicates a second half frame, both the half frame where the starting slot of the first monitoring window is located and the half frame where the first SSB is located are the second half frame.

4. The method of claim 1, further comprising:
determining, by the terminal, a serial number of the radio frame where the starting slot of the first monitoring window is located in the following manner:

if $\left\lfloor (O \cdot 2^\mu + \lfloor i \cdot M \rfloor) / \frac{1}{2} \cdot N_{slot}^{frame,\mu} \right\rfloor \bmod 2 = 0$, $SFN_C \bmod 2 = 0$; or if $\left\lfloor (O \cdot 2^\mu + \lfloor i \cdot M \rfloor) / \frac{1}{2} \cdot N_{slot}^{frame,\mu} \right\rfloor \bmod 2 = 1$, $SFN_C \bmod 2 = 1$, where $SFN_C$ is the serial number of the radio frame where the starting slot of the first monitoring window is located.

5. The method of claim 1, wherein the first downlink control channel is configured to schedule a first downlink data channel, and remaining minimum system information (RMSI) is born in the first downlink data channel.

6. A method for determining resources for a control channel, comprising:
transmitting, by a network device, a first synchronization signal block (SSB) to a terminal to enable the terminal to determine, based on the first SSB, that a serial number of a starting slot of a first monitoring window of a first downlink control channel in a radio frame is:

$$n_0 = (O \cdot 2^\mu + \lfloor i \cdot M \rfloor) \bmod \left( \frac{1}{2} \cdot N_{slot}^{frame,\mu} \right) \text{ or,}$$

$$n_0 = (O \cdot 2^\mu + \lfloor i \cdot M \rfloor) \bmod \left( \frac{1}{2} \cdot N_{slot}^{frame,\mu} \right) + \frac{1}{2} \cdot N_{slot}^{frame,\mu} \cdot HRF,$$

where $n_0$ is the serial number of the starting slot of the first monitoring window in the radio frame, $N_{slot}^{frame,\mu}$ is a number of slots in the radio frame, M and O are determined through resource configuration information in a physical broadcast channel (PBCH) of the first SSB, μ is determined through a subcarrier spacing of the first downlink control channel, HRF is a serial number of a half frame, and i is a serial number of the first SSB.

7. The method of claim 6, wherein, in case that the serial number of the starting slot of the first monitoring window in the radio frame is $$n_0 = (O \cdot 2^\mu + \lfloor i \cdot M \rfloor) \bmod \left( \frac{1}{2} \cdot N_{slot}^{frame,\mu} \right),$$

the starting slot of the first monitoring window is located in slots of a first half frame of the radio frame; or,
the starting slot of the first monitoring window is located in slots of a second half frame of the radio frame.

8. The method of claim 6, wherein, in case that the serial number of the starting slot of the first monitoring window in the radio frame is $$n_0 = (O \cdot 2^\mu + \lfloor i \cdot M \rfloor) \bmod \left( \frac{1}{2} \cdot N_{slot}^{frame,\mu} \right) + \frac{1}{2} \cdot N_{slot}^{frame,\mu} \cdot HRF,$$

a serial number of a half frame where the starting slot of the first monitoring window is located is the same as a serial number of a half frame where the first SSB is located; and
when HRF indicates the first half frame, both the half frame where the starting slot of the first monitoring window is located and the half frame where the first SSB is located are the first half frame; or when HRF indicates the second half frame, both the half frame where the starting slot of the first monitoring window is located and the half frame where the first SSB is located are the second half frame.

9. The method of claim 6, wherein the first SSB is further configured to determine a serial number of the radio frame where the starting slot of the first monitoring window is located in the following manner:

if $\left\lfloor (O \cdot 2^\mu + \lfloor i \cdot M \rfloor) / \frac{1}{2} \cdot N_{slot}^{frame,\mu} \right\rfloor \bmod 2 = 0$, $SFN_C \bmod 2 = 0$; or if $\left\lfloor (O \cdot 2^\mu + \lfloor i \cdot M \rfloor) / \frac{1}{2} \cdot N_{slot}^{frame,\mu} \right\rfloor \bmod 2 = 1$, $SFN_C \bmod 2 = 1$, where $SFN_C$ is the serial number of the radio frame where the starting slot of the first monitoring window is located.

10. The method of claim 6, wherein the first downlink control channel is configured to schedule a first downlink data channel, and remaining minimum system information (RMSI) is born in the first downlink data channel.

11. A device for determining resources for a control channel, comprising:
a transmission device, configured to receive a first synchronization signal block (SSB);
a memory storing a program; and
a processor, configured to run the program to determine, based on the first SSB, that a serial number of a starting slot of a first monitoring window of a first downlink control channel in a radio frame is:

$$n_0 = (O \cdot 2^\mu + \lfloor i \cdot M \rfloor) \bmod \left(\frac{1}{2} \cdot N_{slot}^{frame,\mu}\right) \text{ or,}$$

$$n_0 = (O \cdot 2^\mu + \lfloor i \cdot M \rfloor) \bmod \left(\frac{1}{2} \cdot N_{slot}^{frame,\mu}\right) + \frac{1}{2} \cdot N_{slot}^{frame,\mu} \cdot HRF,$$

where $n_0$ is the serial number of the starting slot of the first monitoring window in the radio frame, $N_{slot}^{frame,\mu}$ is a number of slots in the radio frame, M and O are determined through resource configuration information in a physical broadcast channel (PBCH) of the first SSB, $\mu$ is determined through a subcarrier spacing of the first downlink control channel, HRF is a serial number of a half frame, and i is a serial number of the first SSB.

12. The device of claim 11, wherein, in case that the serial number of the starting slot of the first monitoring window in the radio frame is $$n_0 = (O \cdot 2^\mu + \lfloor i \cdot M \rfloor) \bmod \left(\frac{1}{2} \cdot N_{slot}^{frame,\mu}\right),$$

the starting slot of the first monitoring window is located in slots of a first half frame of the radio frame; or,
the starting slot of the first monitoring window is located in slots of a second half frame of the radio frame.

13. The device of claim 11, wherein, in case that the serial number of the starting slot of the first monitoring window in the radio frame is $$n_0 = (O \cdot 2^\mu + \lfloor i \cdot M \rfloor) \bmod \left(\frac{1}{2} \cdot N_{slot}^{frame,\mu}\right) + \frac{1}{2} \cdot N_{slot}^{frame,\mu} \cdot HRF,$$

a serial number of a half frame where the starting slot of the first monitoring window is located is the same as a serial number of a half frame where the first SSB is located; and
when HRF indicates a first half frame, both the half frame where the starting slot of the first monitoring window is located and the half frame where the first SSB is located are the first half frame; or
when HRF indicates a second half frame, both the half frame where the starting slot of the first monitoring window is located and the half frame where the first SSB is located are the second half frame.

14. The device of claim 11, wherein the processor is further configured to run the program to determine a serial number of the radio frame where the starting slot of the first monitoring window is located in the following manner:

$$\text{if } \left\lfloor (O \cdot 2^\mu + \lfloor i \cdot M \rfloor) \Big/ \frac{1}{2} \cdot N_{slot}^{frame,\mu} \right\rfloor \bmod 2 = 0, SFN_C \bmod 2 = 0; \text{ or}$$

$$\text{if } \left\lfloor (O \cdot 2^\mu + \lfloor i \cdot M \rfloor) \Big/ \frac{1}{2} \cdot N_{slot}^{frame,\mu} \right\rfloor \bmod 2 = 1, SFN_C \bmod 2 = 1,$$

where $SFN_C$ is the serial number of the radio frame where the starting slot of the first monitoring window is located.

15. The device of claim 11, wherein the first downlink control channel is configured to schedule a first downlink data channel, and remaining minimum system information (RMSI) is born in the first downlink data channel.

* * * * *